(12) United States Patent
Lynch et al.

(10) Patent No.: US 8,008,402 B2
(45) Date of Patent: *Aug. 30, 2011

(54) USE OF RECYCLED PLASTICS FOR STRUCTURAL BUILDING FORMS

(75) Inventors: Jennifer K. Lynch, Franklin Park, NJ (US); Thomas J. Nosker, Stockton, NJ (US); Richard Lehman, Princeton, NJ (US); James D. Idol, Columbus, OH (US); Kenneth Van Ness, Lexington, VA (US); Richard W. Renfree, Scotch Plains, NJ (US); Maryann Renfree, legal representative, Scotch Plains, NJ (US)

(73) Assignee: Rutgers, The State University of New Jersey, New Brunswick, NJ (US)

( * ) Notice: Subject to any disclaimer, the term of this patent is extended or adjusted under 35 U.S.C. 154(b) by 542 days.

This patent is subject to a terminal disclaimer.

(21) Appl. No.: 11/914,909

(22) PCT Filed: May 19, 2006

(86) PCT No.: PCT/US2006/019311
§ 371 (c)(1),
(2), (4) Date: Sep. 9, 2008

(87) PCT Pub. No.: WO2006/125111
PCT Pub. Date: Nov. 23, 2006

(65) Prior Publication Data
US 2009/0205278 A1    Aug. 20, 2009

Related U.S. Application Data

(63) Continuation-in-part of application No. 10/563,883, filed as application No. PCT/US03/22893 on Jul. 21, 2003, now Pat. No. 7,795,329.

(60) Provisional application No. 60/683,115, filed on May 19, 2005, provisional application No. 60/486,205, filed on Jul. 8, 2003.

(51) Int. Cl.
*C08J 3/00* (2006.01)

(52) U.S. Cl. ........ 525/197; 525/191; 525/240; 525/242; 523/204; 523/500; 52/578; 52/586.1; 52/782.1; 14/73; 14/77.1; 238/29; 238/84; 238/57; 238/58; 238/67; 428/101; 428/119; 428/54; 428/384

(58) Field of Classification Search .................. 523/204, 523/214, 513, 527; 238/30, 84, 85, 106, 238/98, 54, 29, 57, 83, 90, 91; 14/73, 77.1; 521/40, 40.5, 41, 48; 524/494, 493, 23; 428/119, 428/101, 99, 54, 384, 903.3; 52/578, 586.1, 52/586.2, 782.1, 783.1; 526/72; 525/191, 525/197, 240, 242
See application file for complete search history.

(56) References Cited

U.S. PATENT DOCUMENTS
5,789,477 A    8/1998   Nosker et al.
(Continued)

OTHER PUBLICATIONS

Braestrup; "Footbridge Constructed From Glass-Fibre-Reinforced Profiles, Denmark," Structural Engineering International, 9(4) 256-258, Nov. 1999.

(Continued)

*Primary Examiner* — James Seidleck
*Assistant Examiner* — Frances Tischler
(74) *Attorney, Agent, or Firm* — Fox Rothschild LLP

(57) ABSTRACT

Modular plastic structural composites formed from a mixture of (A) high density polyolefin and one or both of: (B) a thermoplastic-coated fiber material, or (C) polystyrene, poly (methyl methacrylate), or a combination thereof. Composites molded in the form of I-Beams and bridges constructed therefrom are also disclosed.

11 Claims, 13 Drawing Sheets

U.S. PATENT DOCUMENTS

| | | |
|---|---|---|
| 5,916,932 A | 6/1999 | Nosker et al. |
| 6,103,211 A * | 8/2000 | Matsuhisa et al. ......... 423/447.8 |
| 6,191,228 B1 * | 2/2001 | Nosker et al. ................. 525/240 |
| 6,247,651 B1 | 6/2001 | Marinelli |

OTHER PUBLICATIONS

"Recycled Plastic Forms Bridge Beams," Environment News Service, www.ens-news.com (Jan. 21, 2003).

* cited by examiner

Figure 13a. Initial
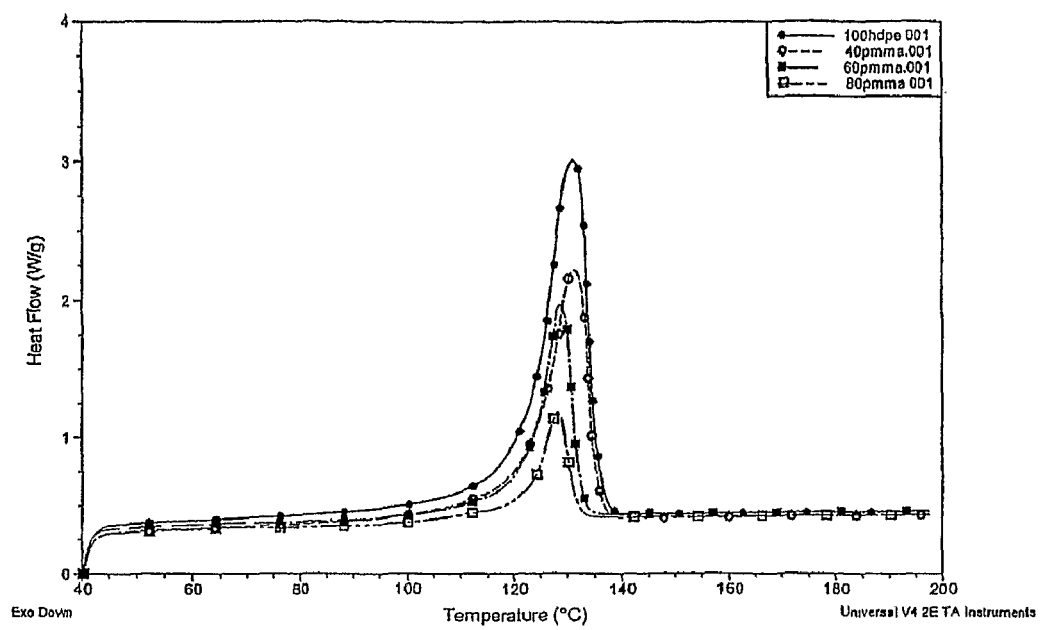
Figure 13b. Reheat
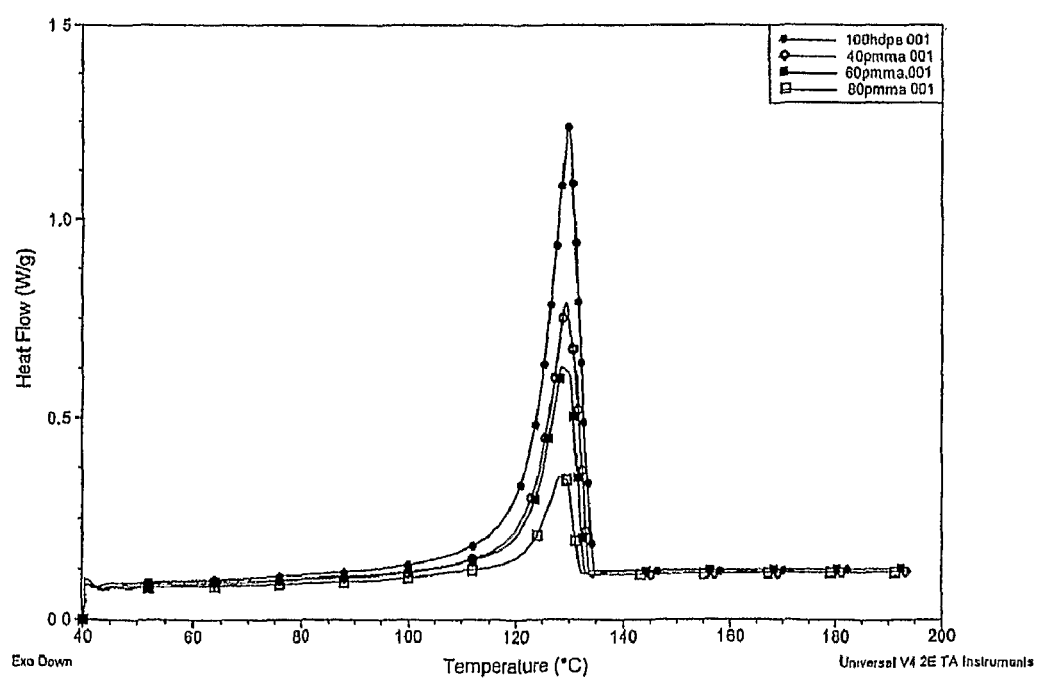

USE OF RECYCLED PLASTICS FOR STRUCTURAL BUILDING FORMS

CROSS-REFERENCE TO RELATED APPLICATIONS

The present application is a National Stage filing of PCT/US06/19311 filed May 19, 2006, which is a continuation-in-part of U.S. patent application Ser. No. 10/563,883 now U.S. Pat. No. 7,795,329, which was filed Jun. 8, 2006 Section 371 completion date. The present application is also a continuation-in-part of U.S. patent application Ser. No. 10/563,883. PCT/US06/19311 and U.S. patent application Ser. No. 10/563,883 both claim priority under 35 U.S.C. §119(e) to U.S. Provisional Application No. 60/683,115, filed May 19, 2005. U.S. patent application Ser. No. 10/563,883 was also the National Stage filing of PCT/US03/22893 filed Jul. 21, 2003, which claims priority under 35 U.S.C. §119(e) to U.S. Provisional Application No. 60/486,205 filed Jul. 8, 2003. The contents of all five applications are incorporated herein by reference in their entirety.

FIELD OF THE INVENTION

This invention pertains to new building forms made of degradation-resistant composites; structures produced from such novel forms; and related methods of producing and using such forms and structures.

BACKGROUND OF THE INVENTION

There presently are over 500,000 wooden vehicular bridges in the United States assembled from chemically treated lumber. An estimated forty percent of them are in need of repair or replacement.

There are several types of chemically treated lumber such as creosoted lumber and pressure treated lumber. These materials are relatively inexpensive to make and use, and they are just as versatile as any other form of wood. They also have enhanced resistance to microbial and fungal degradation and to water.

However, the increasing popularity of chemically treated lumber has some negative repercussions that are just now being realized. Chemically treating lumber takes a perfectly useable, recyclable, renewable resource and renders it toxic. For example "pressure treated" or "CCA" lumber is treated with very poisonous chromated copper arsenic and cannot be burned. While CCA lumber can be buried, the leaching of toxic chemicals makes such disposal strategies undesirable. The disposal of creosoted lumber requires the use of special incinerators. These materials are becoming far more difficult and expensive to dispose of than to use. However, because of the long useful life of these materials, the economic and environmental impact of chemically treated lumber is just beginning to be felt.

Structural recycled plastic lumber represents a possible alternative to chemically treated lumber. U.S. Pat. Nos. 6,191,228, 5,951,940, 5,916,932, 5,789,477, and 5,298,214 disclose structural recycled plastic lumber composites made from post-consumer and post-industrial plastics, in which polyolefins are blended with polystyrene or a thermoplastic coated fiber material such as fiberglass. These structural composites presently enjoy commercial success as replacements for creosoted railroad ties and other rectangular cross-sectioned materials. The market has otherwise been limited for structural recycled plastic lumber, because it is significantly more expensive than treated wooden beams on an installed cost basis, despite the use of recycled waste plastics.

This significant cost difference became more evident in the construction of bridge structures in which pressure-treated wooden beams were replaced with structural recycled plastic lumber composite beams. While as strong as CCA treated wood, the recycled plastic composite beams were not as stiff, and tended to sag, or "creep." It was possible to compensate for this by increasing beam dimensions and using more beams of rectangular cross-section. However, this just added to the already increased cost for materials and construction in comparison to treated lumber.

Structural beams that do not "creep" can also be prepared from engineering resins such as polycarbonates or ABS. However, these are even more costly than the structural composites made from recycled plastics. There remains a need for structural materials based on recycled plastics that are more cost-competitive with treated lumber on an installed cost basis.

BRIEF SUMMARY OF THE INVENTION

It has now been discovered that the immiscible polymer blends of U.S. Pat. Nos. 6,191,228, 5,951,940, 5,916,932, 5,789,477, and 5,298,214 can be formed into structural shapes that are more cost-efficient than traditional recycled plastic structural beams with rectangular cross-sections. The structural shapes according to the present invention are molded as a single integrally-formed article and include modular forms such as I-Beams, T-Beams, C-Beams, and the like, in which one or more horizontal flanges engage an axially disposed body known in the art of I-Beams as a web. The reduced cross-sectional area of such forms represents a significant cost savings in terms of material usage without sacrificing mechanical properties. Additional cost savings are obtained through modular construction techniques permitted by the use of such forms.

Therefore, according to one aspect of the present invention, a modular plastic structural composite is provided having web section disposed along a horizontal axis and at least one flange section disposed along a horizontal axis parallel thereto and integrally molded to engage the top or bottom surface of the web section, wherein the composite is formed from a mixture of (A) high density polyolefin and (B) a thermoplastic-coated fiber material, polystyrene, or a combination thereof. The high-density polyolefin is preferably high-density polyethylene (HDPE). The thermoplastic-coated fiber material is preferably a thermoplastic-coated carbon, or glass fibers such as fiberglass.

Also provided is a modular plastic structural composite comprising a web section disposed along a horizontal axis and at least one flange section disposed along a horizontal axis parallel thereto and integrally molded to engage the top or bottom surface of said web section, wherein said composite is formed from a mixture of (A) high density polyolefin and (B) a thermoplastic-coated fiber material, poly(methyl methacrylate), or a combination thereof.

The flange dimensions relative to the dimensions of the web section cannot be so great to result in buckling of the flange sections upon the application of a load. Preferably, the vertical dimension (thickness) of the flange section is about one-tenth to about one-half the size of the vertical dimension of the web section without any flange section(s) and the width dimension of the entire flange section measured perpendicular to the horizontal axis of the flange section is about two to about ten times the size of the width dimension measured perpendicular to the horizontal axis of the web section.

Other efficient structural shapes according to the present invention include tongue-in-groove shaped boards that form interlocking assemblies. It has been discovered that interlocking assemblies reduce the required board thickness because of the manner in which the assembly distributes loads between the interlocked boards. This also represents a significant cost savings in terms of material usage without sacrificing mechanical properties, with additional cost savings also obtained through the modular construction techniques these forms permit.

Therefore, according to another aspect of the present invention, an essentially planar modular plastic structural composite is provided having a grooved side and an integrally molded tongue-forming side, each perpendicular to the plane of the composite, in which the composite is formed from a mixture of (A) high-density polyolefin and (B) a thermoplastic-coated fiber material, polystyrene, or a combination thereof, wherein the grooved side defines a groove and the tongue-forming side is dimensioned to interlockingly engage a groove having the dimensions of the groove defined by the grooved side, and the grooved side and tongue-forming side are dimensioned so that a plurality of the essentially planar modular plastic structural composites may be interlockingly assembled to distribute a load received by one assembly member among other assembly members.

According to another embodiment of this aspect of the present invention, a modular structural composite is provided in which polystyrene is replaced with poly(methyl methacrylate) (PMMA). Preferably, at least 90% and, more preferably, all of the polystyrene is replaced with poly(methyl methacrylate). In one embodiment, the composite includes from about 20 to about 65 wt % of a poly(methyl methacrylate) component containing at least about 90 wt % poly(methyl methacrylate) and from about 40 to about 80 wt % of a high-density polyolefin component containing at least about 75 wt % high-density polyethylene (HDPE).

Preferred planar modular plastic structural composites have at least one pair of parallel opposing grooved and tongue-forming sides, defining therebetween a width or length dimension of the composite. Preferred composites also have board-like dimensions in which the length dimension is a matter of design choice and the width dimension is between about two and about ten times the size of the height, or thickness, dimension of the composite.

The modular plastic structural composites have utility in the construction of load-bearing assemblies such as bridges. Therefore, according to yet another aspect of the present invention, a bridge is provided, constructed from the I-Beams of the present invention, having at least two pier-supported parallel rows of larger first I-beams, and a plurality of smaller second I-beams disposed parallel to one another and fastened perpendicular to and between two rows of the larger first I-Beams, wherein the top and bottom surfaces of the second I-Beam flanges are dimensioned to nest within the opening defined by the top and bottom flanges of the first I-Beams.

The distance between the rows of first I-Beams and the rows of second I-Beams will depend upon factors such as the flange and web dimensions, the plastic components of the composite and the load to be supported by the bridge. Furthermore, whether the horizontally disposed axes of the first or second I-Beams extend in the direction of travel on the bridge is a matter of design choice, which may in whole or in part depend upon the aforementioned factors.

Because the second I-Beams are nested within the opening defined by the top and bottom flanges of the first I-Beams, the top surfaces of the second I-Beams are recessed below the top surfaces of the first I-Beams by a distance that is at least the thickness dimension of the top flange of the first I-Beam. Bridges constructed according to this aspect of the present invention will therefore further include a deck surface fastened to the first or second I-Beams. Preferred deck surfaces are dimensioned to fit between the top flanges of the parallel rows of the first I-beams. Even more preferred deck surfaces have a thickness dimension selected to provide the deck surface with a top surface that is essentially flush with the top surfaces of the parallel rows of first I-Beams. Other preferred deck surfaces are formed from the essentially planar modular plastic structural composites of the present invention having interlocking grooved and tongue-forming sides.

The modular components of the present invention permit the construction of load-bearing assemblies with fewer required fasteners, reducing the initial bridge cost, as well as the long-term cost of maintaining and replacing these corrosion-prone components. The plastic composite material also outlasts treated wood and requires significantly less maintenance than wood over its lifetime, further contributing to cost savings.

Also provided is a composite building material formed from a mixture of high density polyolefin and poly(methyl methacrylate). This material can be formed into various articles such as railroad ties and structural sheets.

Further, despite the unpredictability of polymer blending, it has also been discovered that polyolefin and poly(methyl methacrylate) can form immiscible polymer blends by replacing polystyrene with PMMA. This observation is surprising because there is no way to predict which plastics will form acceptable immiscible polymer blends with polyolefin. For example, polyvinyl chloride does not form such a blend with polyolefin.

The polyolefin/PMMA blends of the present invention possess unexpected properties. For example, they are stiffer than the polyolefin/polystyrene blends even though polystyrene and PMMA alone each have essentially the same stiffness, as measured by tensile modulus. It is also surprising that the polyolefin/PMMA blends are nearly as strong as PMMA alone.

The foregoing and other objects, features and advantages of the present invention are more readily apparent from the detailed description of the preferred embodiments set forth below taken in conjunction with the accompanying drawings.

BRIEF DESCRIPTION OF THE DRAWINGS

FIG. 13a is a heat flow analysis to determine the melting point of extruded composites upon initial heating;

FIG. 13b is a heat flow analysis to determine the melting point of extruded composites following the initial heating shown in FIG. 13a;

DETAILED DESCRIPTION OF THE INVENTION

Figure 1:
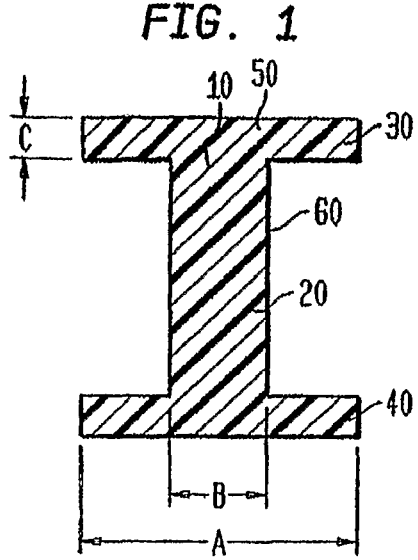
FIG. 1 depicts a cross-sectional view of an I-Beam according to the present invention.

The modular plastic structural composites of the present invention are prepared using the co-continuous polymer blend technology disclosed by U.S. Pat. Nos. 5,298,214 and 6,191,228 for blends of a high-density polyolefin and polystyrene and by U.S. Pat. No. 5,916,932 for blends of a high-density polyolefin and thermoplastic-coated fiber materials. The disclosures of all three patents are incorporated herein by reference.

As disclosed in U.S. Pat. No. 6,191,228, composite materials may be employed containing from about 20 to about 50 wt % of a polystyrene component containing at least about 90 wt % polystyrene and from about 50 to about 80 wt % of a high-density polyolefin component containing at least about 75 wt % high-density polyethylene (HDPE). Composite materials containing about 25 to about 40 wt % of a polystyrene component are preferred, and composite materials containing about 30 to about 40 wt % of a polystyrene component are even more preferred. Polyolefin components containing at least about 80 wt % HDPE are preferred, and an HDPE content of at least about 90 wt % is even more preferred.

The blend technology disclosed in U.S. Pat. No. 6,191,228 can also be employed in the present invention to formulate composite materials comprising a poly(methyl methacrylate) component in place of or in addition to the polystyrene component. Composite materials may be employed containing a poly(methyl methacrylate) (PMMA) component containing at least 90 wt % PMMA with the balance of the composite material being a high-density polyolefin component containing at least 75 wt % high-density polyethylene (HDPE). Polyolefin components containing at least about 80 wt % HDPE are preferred, and an HDPE content of at least about 90 wt % is even more preferred. The minimum amount of the PMMA component in the blend is that quantity effective to produce a perceptible increase in melt viscosity. Composite materials containing from about 0.1 to about 65 wt % of poly(methyl methacrylate) (PMMA) are preferred. Composite materials containing from about 10 to about 40 wt % of PMMA are more preferred, and composite materials containing from about 20 to about 35 wt % of PMMA are most preferred.

The polyolefin/PMMA blends of the present invention possess unexpected properties. For example, they are stiffer than the polyolefin/polystyrene blends even though polystyrene and PMMA alone each have essentially the same stiffness, as measured by tensile modulus. They are also tougher than the polyolefin/polystyrene blends. "Toughness" is defined as the ability to absorb energy while being deformed without fracturing. For example, a bridge made from the polyolefin/PMMA blend It is also surprising that the polyolefin/PMMA blends are nearly as strong as PMMA alone.

According to the process disclosed by U.S. Pat. No. 5,916,932 this composite may be further blended with thermoplastic-coated fibers having a minimum length of 0.1 mm so that the finished product contains from about 10 to about 80 wt % of the thermoplastic-coated fibers. U.S. Pat. No. 5,916,932 discloses composite materials containing from about 20 to about 90 wt % of a polymer component that is at least 80 wt % HDPE and from about 10 to about 80 wt % of thermoplastic-coated fibers.

The polyolefin-polystyrene composite materials suitable for use with the present invention exhibit a compression modulus of at least 170,000 psi and a compression strength of at least 2500 psi. Preferred polyolefin-polystyrene composite materials exhibit a compression modulus of at least 185,000 psi and a compression strength of at least 3000 psi. More preferred polyolefin-polystyrene composite materials exhibit a compression modulus of at least 200,000 psi and a compression strength of at least 3500 psi.

Preferred polyolefin-PMMA composite materials suitable for use with the present invention exhibit a compression modulus of at least 227,000 psi and a compression strength of at least 3900 psi. The most preferred polyolefin-PMMA composite materials exhibit a compression modulus of at least 249,000 psi and a compression strength of at least 4300 psi.

Composite materials containing thermoplastic-coated fibers according to the present invention exhibit a compression modulus of at least 350,000 psi. The compression modulus exhibited by preferred fiber-containing materials is at least 400,000 psi. The composite materials containing thermoplastic-coated fibers exhibit a compression strength of at least 4000 psi. The compression strength exhibited by preferred fiber-containing materials is at least 5000 psi.

The polyolefin/PMMA blends of the present invention are suitable for composite building materials, such as, dimensional lumber. Lumber made from these blends can be used as joists, posts, and beams, for example. The toughness of polyolefin/PMMA lumber offers an additional safety feature as the material would sag before fracture to provide a warning of possible failure. The thermoplastic fiber-containing polyolefin/PMMA blends are also suitable for the fabrication of railroad ties.

For certain applications such as, for example, railroad ties, it is important that the composite building material exhibit some very specific properties. For example, the material must be non-water or fuel absorbent, resistant to degradation and wear, resistant to the typical range of temperatures through which train tracks are exposed and non-conductive. In addition, the railroad ties must meet certain mechanical criteria. For example, the plastic composite railroad tie will have a compressive modulus of at least about 170,000 psi along the tie's axis. By the term "tie's axis" it is meant the longest axis of the railroad tie. More preferably, the composite building material useful as a railroad tie will have a compressive modulus along the tie's axis of at least 200,000 psi and even more preferably 225,000 psi. Most preferably, when used for railroad ties, the plastic composite material will have a compressive modulus of at least about 250,000 psi.

The present invention is particularly well suited for railroad ties because of the different properties exhibited by the composite building materials along different axes. Because of the highly oriented fiber content in the direction of the floor (the long axis of a railroad tie), the tie exhibits incredible strength and rigidity along that axis. At the same time, in a perpendicular axis which cuts across the orientation of the fiber content, the tie is relatively softer and flexible. Thus, a railroad tie made from the composite building material in accordance with the present invention will not bend or stress rail laid perpendicularly thereon, as there is some give in that direction. However, because of the strength of the tie along the tie's longest axis, rails attached thereto will not be allowed to shift laterally or separate. For this reason, the railroad ties of the present invention are vastly superior to either wood or concrete ties currently employed.

In addition, in terms of railroad ties, it is important that rails attached thereto not be separated by more than about 0.3175 cm when placed under a lateral load of a least about 24,000 lbs. Lateral load refers to the outward pressure exerted by the train's wheels on the rails. The composite building material should also bear a vertical static load of at least about 39,000 lbs. This measures a tie's ability to stand up to having a train parked on top of it without permanent deformation, or having the rail driven into the tie. Further, the toughness of the polyolefin/PMMA material improves the ability of the material to accept a spike without fracturing. A vertical dynamic load of at least 140,000 lbs. is also required. This measures the ability of a tie to handle train traffic.

Figure 2:
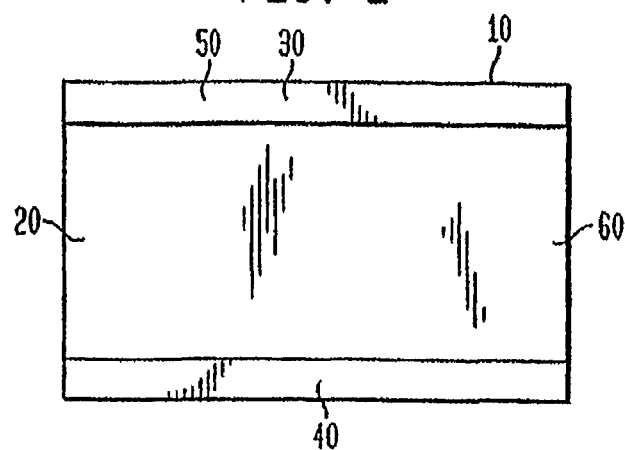
FIG. 2 is a side-view of the I-Beam of FIG. 1, perpendicular to the cross-sectional view.

Both polyolefin/polystyrene and polyolefin/PMMA blends can also be used to form the flanged structural members of the present invention. A cross-sectional view of an I-Beam 10 according to the present invention is depicted in FIG. 1, with a side view of the same I-Beam shown in FIG. 2. The I-beam has a traditional structure consisting of middle "web" or "body" section 20, an upper flange 30, and a lower flange 40. The flange sections include a protruding section 50 that extends beyond the width of the web 20. The face of the web 60 forms a structure that can engage other structures (e.g., smaller beams), as described further below. The width A of the flange sections is significantly wider than the width B of the web section. The height C of the flange sections is smaller than the height of the web sections. Despite the thin height of the flange section and the narrow width of the web section, the I-Beam is capable of supporting heavy structures and can be used in load-bearing structures, such as bridges and the like.

Figure 3:
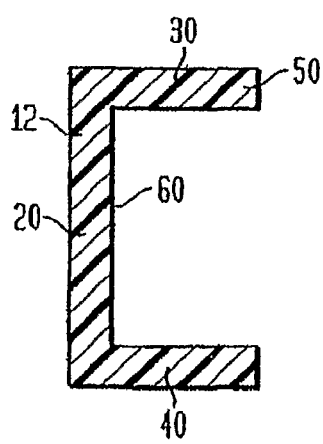
FIG. 3 depicts a cross-sectional view of a C-Beam according to the present invention.
Figure 4:
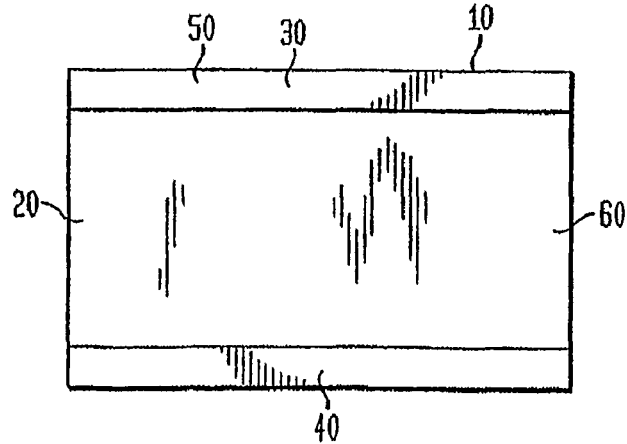
FIG. 4 is a side view of the C-Beam of FIG. 3, perpendicular to the cross-sectional view.

A cross-sectional view of a C-Beam 12 according to the present invention is depicted in FIG. 3, with a side view of the same C-Beam shown in FIG. 4. The C-beam also has a middle web section 20, an upper flange 30, and a lower flange 40. The flange sections also include a protruding section 50 that extends beyond the width of the web 20. The face of the web 60 also forms a structure that can engage other structures (e.g., smaller beams), as described further below.

Figure 5:
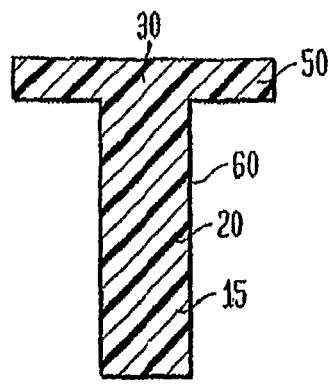
FIG. 5 depicts a cross-sectional view of a T-Beam according to the present invention.
Figure 6:
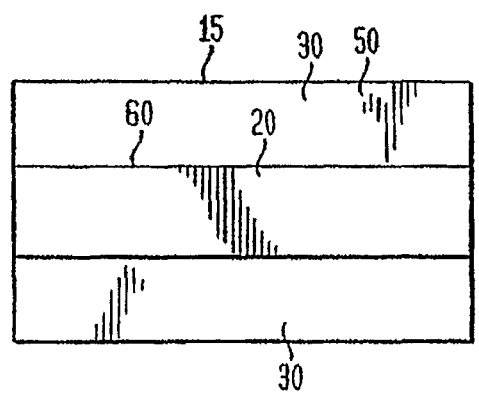
FIG. 6 is a bottom view of the T-Beam of FIG. 5.

A cross-sectional view of a T-Beam 15 according to the present invention is depicted in FIG. 5, with a bottom view of the same T-Beam shown in FIG. 6. The T-beam has a structure consisting of middle web section 20 and an upper flange 30, but no lower flange. The flange section also includes a protruding section 50 that extends beyond the width of the web 20. The face of the web 60 also forms a structure that can engage other structures (e.g., smaller beams), as described further below.

Figure 7:
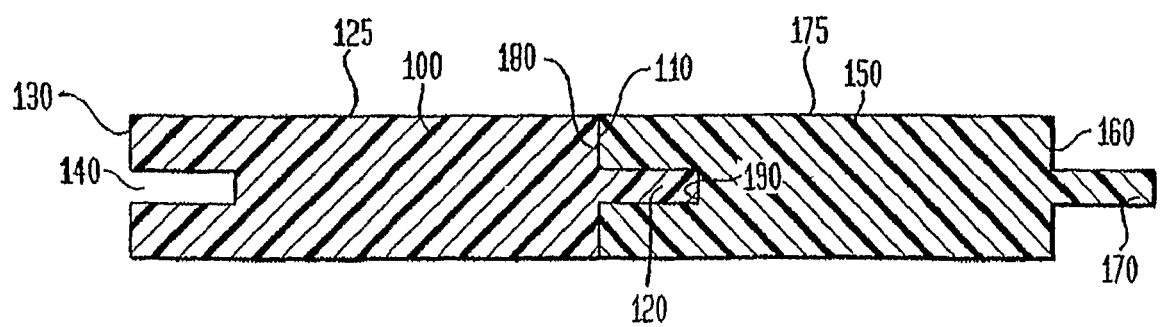
FIG. 7 depicts a cross-sectional view of tongue and groove decking panels according to the present invention.

FIG. 7 shows assembled tongue-and-groove decking panels 100 and 150. Panel 100 includes an end 110 having a tongue-shaped member 120 and an opposite end 130 defining a groove 140. Panel 150 includes an end 160 having a tongue-shaped member 170 and an opposite end 180 defining a groove 190. Tongue-shaped member 120 of panel 100 is depicted interlockingly engaging the groove 190 of panel 150. The groove 140 of panel 100 is also capable of interlockingly engaging a tongue-shaped member of another panel. Likewise, the tongue-shaped member 170 of panel 150 is capable of engaging a groove of another panel. Flat top 125 of panel 100 and flat top 175 of panel 150 can serve as a load-bearing surface or barrier when such panels are assembled into a structure.

Figure 8:
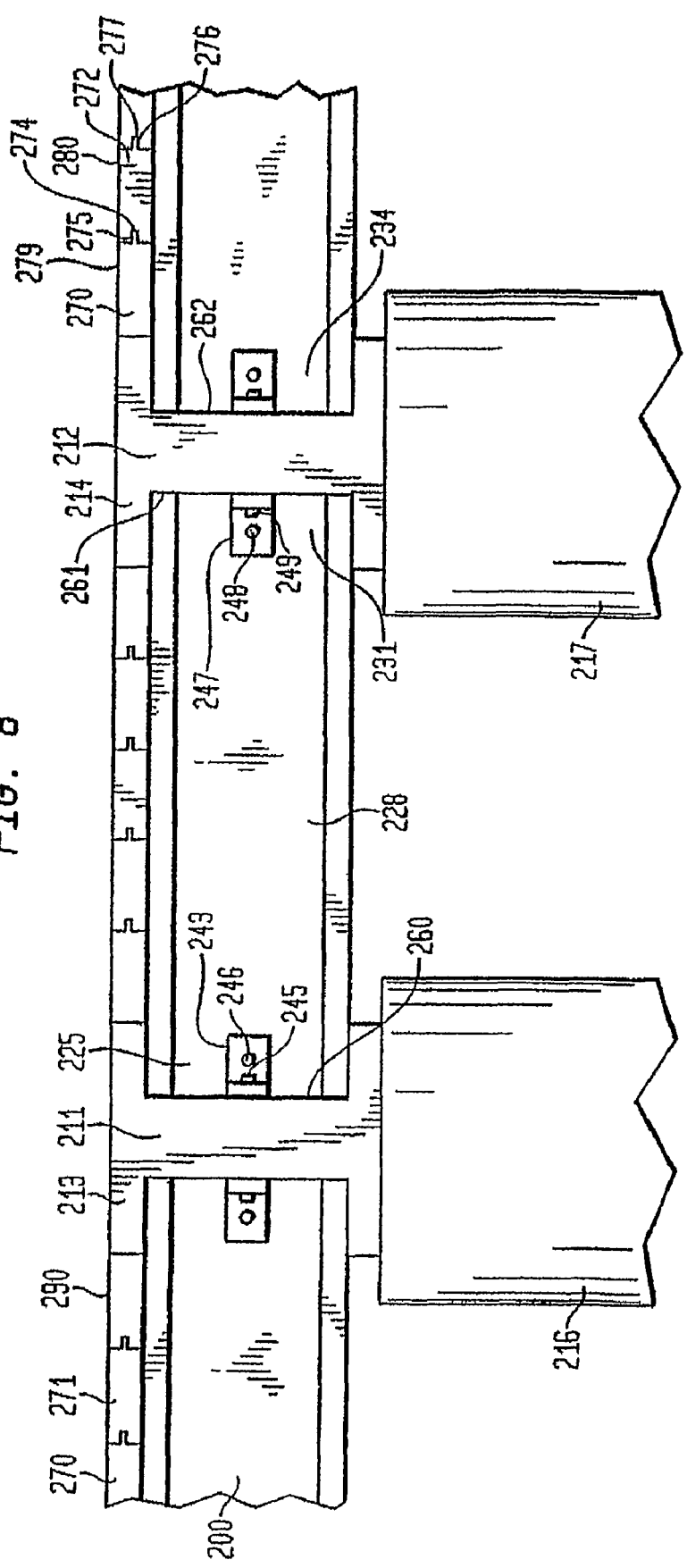
FIG. 8 depicts a side view of a bridge according to the present invention assembled from the I-Beams of the present invention.
Figure 9:
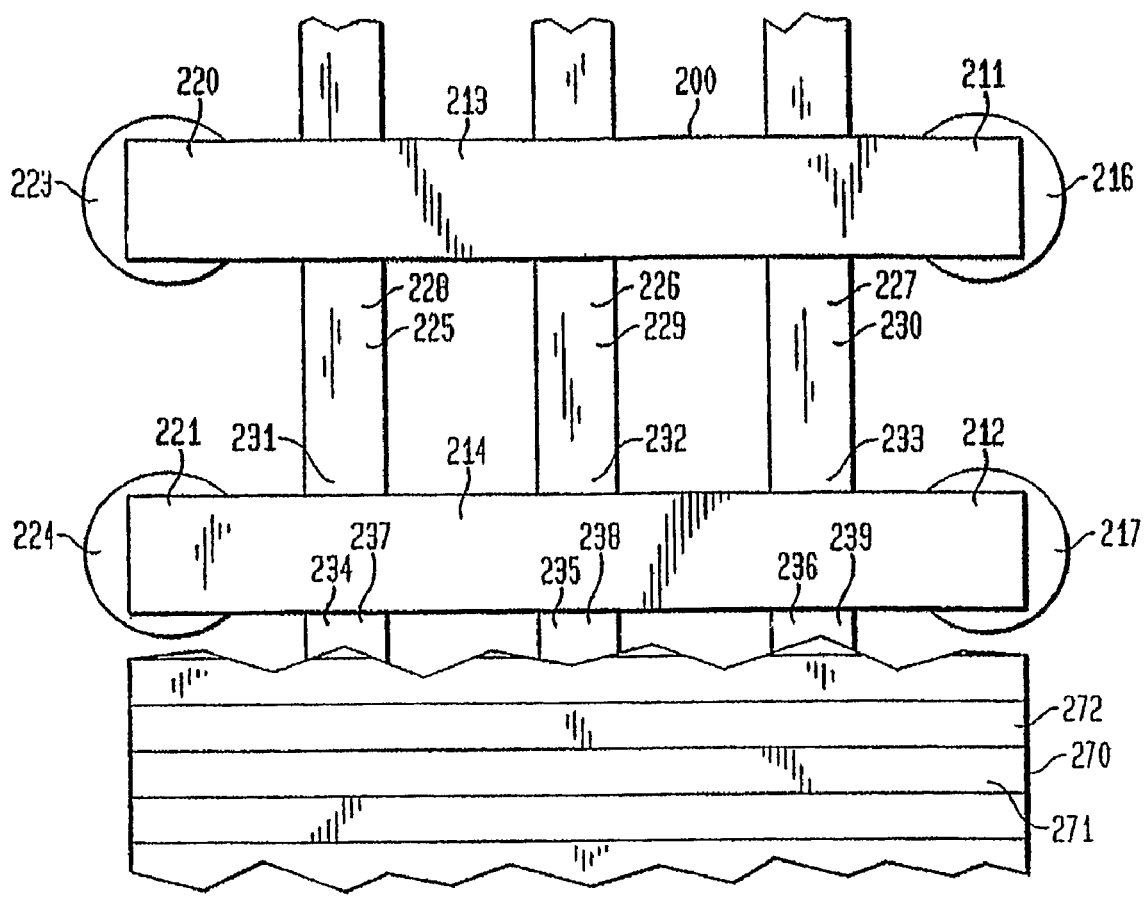
FIG. 9 is a top cutaway view of the bridge of FIG. 8.

FIG. 8 illustrates a side view and FIG. 9 a top partial cutaway view of a portion of a vehicular bridge 200 assembled from the above-described building forms. In the bridge structure, ends 211 and 212 of respective larger I-beam rails 213 and 214 are secured to respective pilings 216 and 217 by fasteners (not shown). The opposite respective I-Beam ends 220 and 221 are similarly secured to respective pilings 223 and 224. Ends 225, 226 and 227 of smaller joist I-beams 228, 229 and 230 are fastened to the face 260 of I-Beam 213, with respective opposing ends 231, 232 and 233 of the three smaller I-Beams fastened to the face 261 of I-Beam 214. Similarly, ends 234, 235 and 236 of smaller joist I-beams 237, 238 and 239 are fastened to the face 262 of I-Beam 214.

Figure 10:
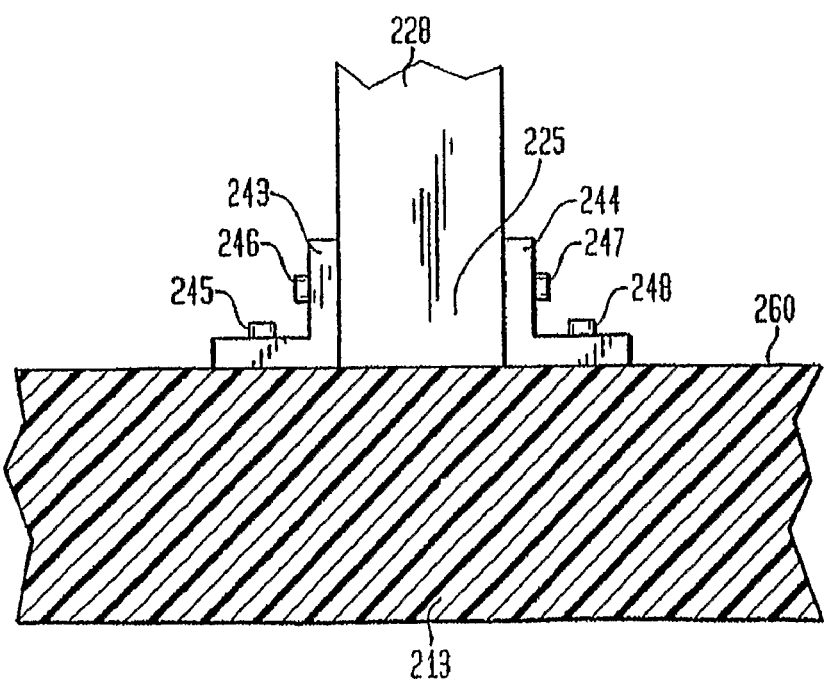
FIG. 10 is a top cutaway view depicting the perpendicular fastening of a smaller I-Beam according to present invention to a larger I-Beam according to the present invention.

FIG. 10 is a top cutaway view depicting the fastening of end 225 of smaller joist I-Beam 228 to the face 260 of larger I-Beam 213 using L-shaped brackets 243 and 244 and fasteners 245, 246, 247 and 248. Bracket 243 and fasteners 245 and 246 fastening the end 225 of I-Beam 228 to face 260 of I-Beam 213 is also shown in FIG. 8. FIG. 8 also shows bracket 247 and fasteners 248 and 249 fastening end 231 of I-Beam 228 to face 261 of I-Beam 214.

FIGS. 8 and 9 also show bridge deck 270 formed from interlocking panels 271 and 272 in which tongue 274 of panel 271 interlockingly engages groove 275 of panel 272. Tongue 276 of panel 272 interlockingly engages groove 277, and so forth. The respective top surfaces 279 and 280 of panels 271 and 272 comprise the surface 290 of bridge deck 270.

Suitable fasteners are essentially conventional and include, without limitation, nails, screws, spikes, bolts, and the like.

The molding processes disclosed in U.S. Pat. Nos. 5,298,214, 5,916,932 and 6,191,228 may be employed to form the modular plastic structural composite shapes of the present invention. However, because articles are being formed having an irregular cross section in comparison to the beams having rectangular cross-sections that were previously molded, the composite blends are preferably extruded into molds from the extruder under force, for example from about 900 to about 1200 psi, to solidly pack the molds and prevent void formation. Likewise, it may be necessary to apply force along the horizontal beam axis, for example using a hydraulic cylinder extending the length of the horizontal axis, to remove cooled modular shapes from their molds.

Composite I-Beams of polyolefin and polystyrene according to the present invention having a 61 square-inch cross-sectional area exhibit a Moment of Inertia of 900 in$^4$. Polyolefin-polystyrene composite I-Beams according to the present invention having a 119 square-inch cross-sectional area exhibit a Moment of Inertia of 4628 in⁴. This represents the largest Moment of Inertia ever produced by any thermoplastic material for any structure, and compares to Moments of Inertial measured between 257 and 425 in⁴ for rectangular cross-section wooden beams having a 63 square-inch cross-sectional area and Moments of Inertial measured between 144 and 256 in⁴ for rectangular cross-section wooden beams having a 48 square-inch cross-sectional area. The end result is that a polyolefin-polystyrene composite bridge that would have weighed 120,000 pounds for the required load rating if prepared from rectangular cross-section composite materials, weighs just 30,000 pounds instead when prepared from the I-Beams of the present invention.

Both polyolefin/polystyrene and polyolefin/PMMA blends can also be used to form structural sheets having a thickness preferably from about ⅛ inch to about 1 inch. The length and width of the sheets preferably independently range from about 8 inches to about 20 feet. The structural sheets also have a compression modulus of at least 200,000 psi and a strength of at least 3,000 psi. "Strength" is defined as the highest stress level a material can be subjected to without fracturing into multiple pieces.

The modular plastic structural composites of the present invention thus represent the most cost-effective non-degradable structural materials prepared to date having good mechanical properties. The present invention makes possible the preparation of sub-structures with given load ratings from quantities of materials reduced to levels heretofore unknown.

The foregoing description of the preferred embodiment should be taken as illustrating, rather than as limiting, the present invention as defined by the claims. As would be readily appreciated, numerous variations and combinations of the features set forth above can be utilized without departing from the present invention as set forth in the claims. Such variations are not regarded as a departure from the spirit and scope of the invention, and all such variations are intended to be included within the scope of the following claims.

EXAMPLES

The following examples provide representative preparation methods for polyolefin/PMMA blends according to the present invention.

Example 1

Extrusion

HDPE (CP Chem Marlex HHM-5502BN) and PMMA (Atofina Plexiglass V045100) were mechanically mixed and melt blended using a Randcastle special compounding extruder operating at 180 RPM and 200-210° C. Composition ratios of HDPE/PMMA were: 100/0, 90/10, 80/20, 70/30, 65/35, 60/40, 50/50, 40/60, 30/70, 20/80, 10/90, and 0/100.

Figure 11:
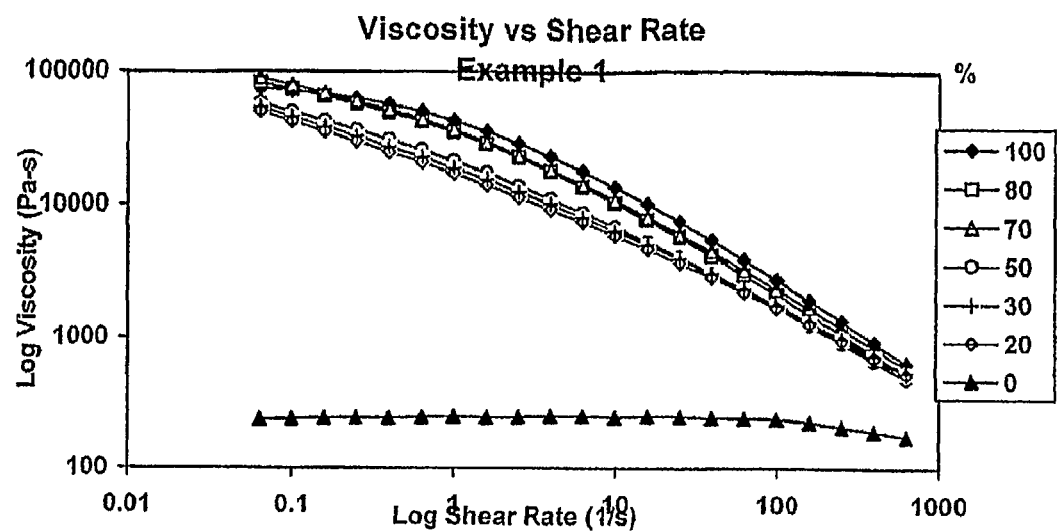
FIG. 11 is a plot of log viscosity versus log shear rate comparing extruded composites having various percentages of PMMA.
Figure 12:
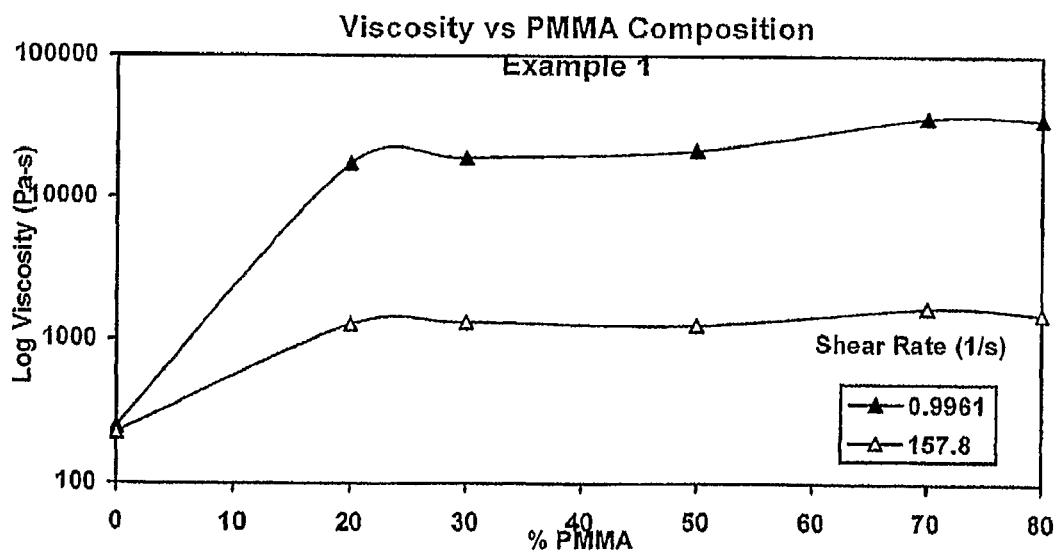
FIG. 12 is a plot of log viscosity versus percent PMMA for extruded composites.
Figure 13C:
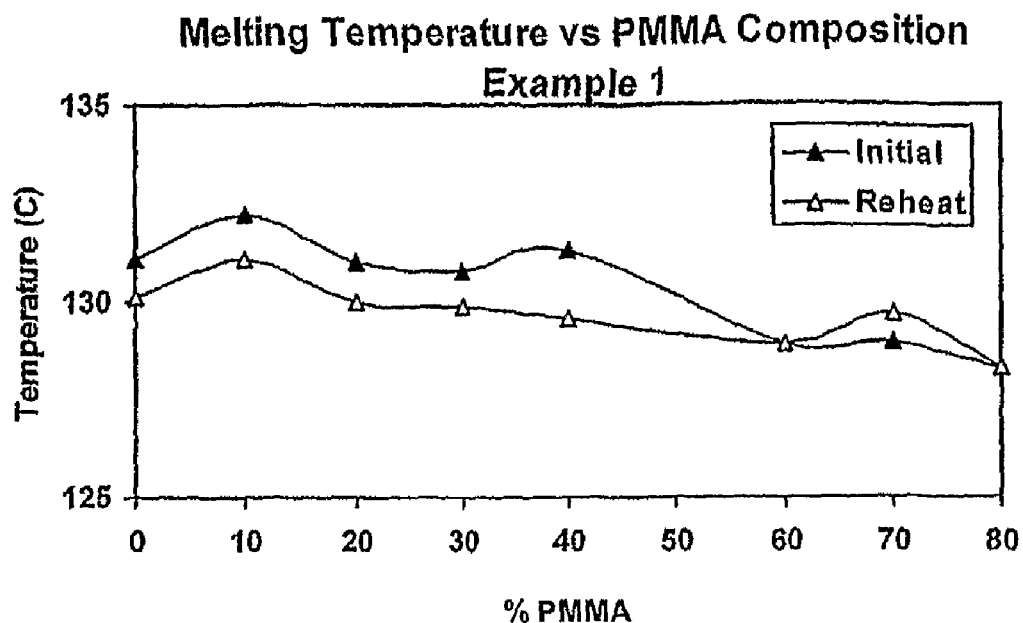
FIG. 13c is a plot of the melting temperatures of extruded composites as a function of percent PMMA.
Figure 13D:
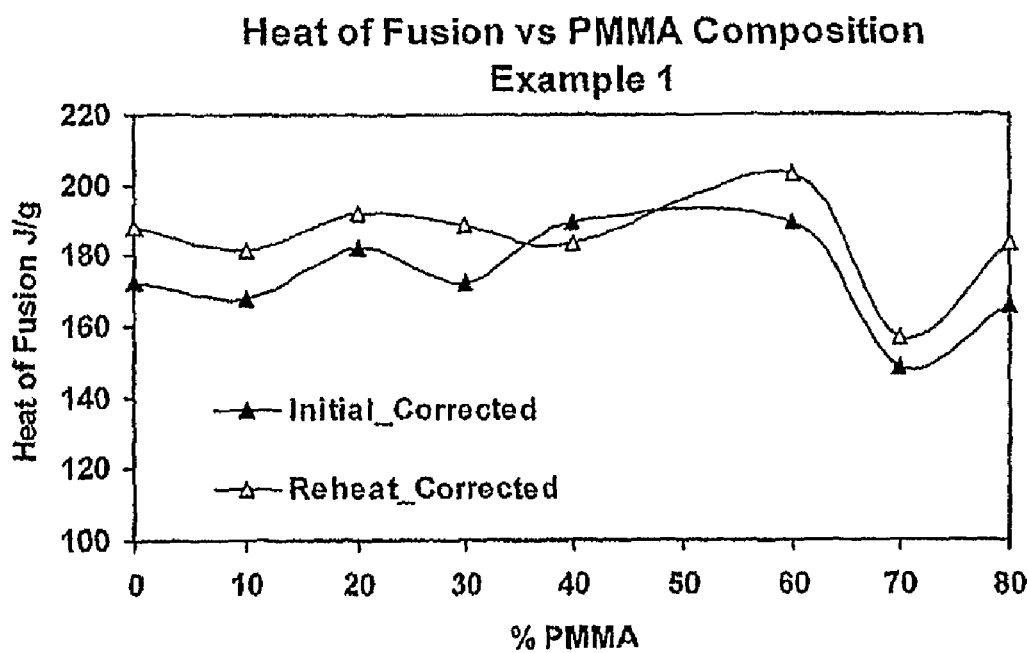
FIG. 13d is a plot of the heat of fusion of extruded composites as a function of percent PMMA.

Rheological tests were conducted to investigate the viscosity of the pelletized extruded composites. As the PMMA content of the extruded composites increases towards neat PMMA, the viscosity of the extruded composites increases (FIG. 11). At both low and high shear rates, a non-linear dependence of viscosity on PMMA concentration was observed (FIG. 12).

Thermal analysis of the extruded composites was conducted to examine the melting temperature and heat of fusion (FIGS. 13a-d). The heat of fusion of the blends approximately correlates to the percentage of meltable polyolefin in the blend.

Figure 14:
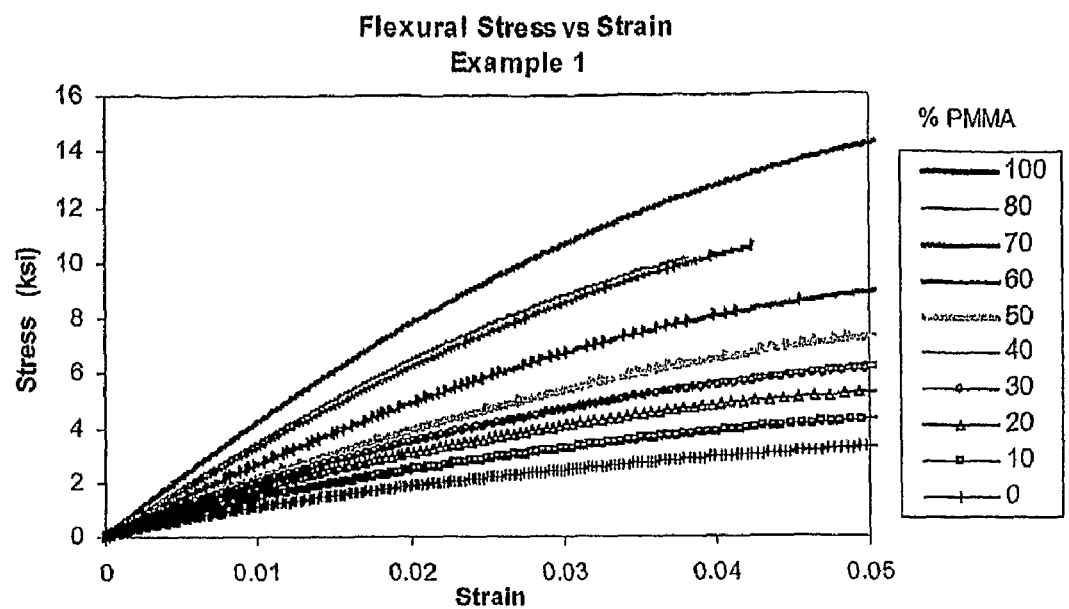
FIG. 14 is a plot of stress versus strain for extruded composites.

Flexural experiments were conducted to investigate the mechanical properties of the extruded composites. Sample diameter ranged from 1.18-1.95 mm. The support span was either 20 or 28 mm to maintain a 16:1 L:D ratio. FIG. 14 is a plot of stress versus strain for each extruded composite. Table I sets forth the modulus (the ratio of stress to strain in flexural deformation) of the extruded composites according to composition:

TABLE I

| % PMMA | % HDPE | Modulus (MPa) | Standard Deviation (MPa) | Modulus (ksi) |
|---|---|---|---|---|
| 0 | 100 | 1154 | 36 | 167 |
| 10 | 90 | 1508 | 94 | 219 |
| 20 | 80 | 1916 | 87 | 278 |
| 30 | 70 | 2017 | 104 | 292 |
| 35 | 65 | 1689 | 85 | 245 |
| 40 | 60 | 1805 | 113 | 262 |
| 50 | 50 | 2053 | 269 | 298 |
| 60 | 40 | 2495 | 250 | 362 |
| 70 | 30 | 2667 | 155 | 387 |
| 80 | 20 | 2761 | 147 | 400 |
| 100 | 0 | 3437 | 104 | 498 |

Figure 15:
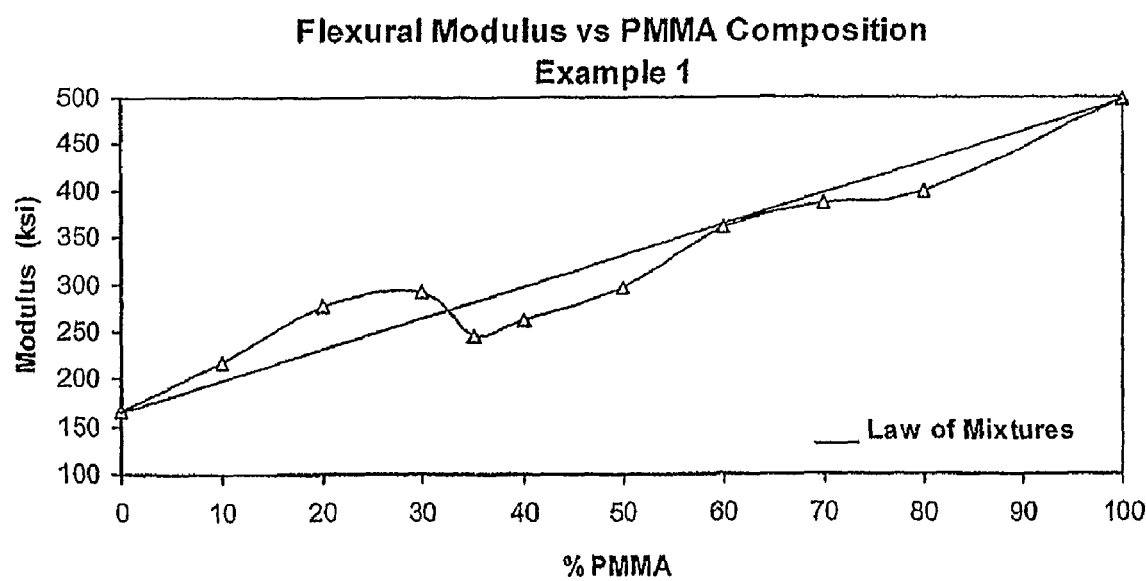
FIG. 15 is a plot of modulus as a function of percent PMMA for extruded composites.
Figure 16:
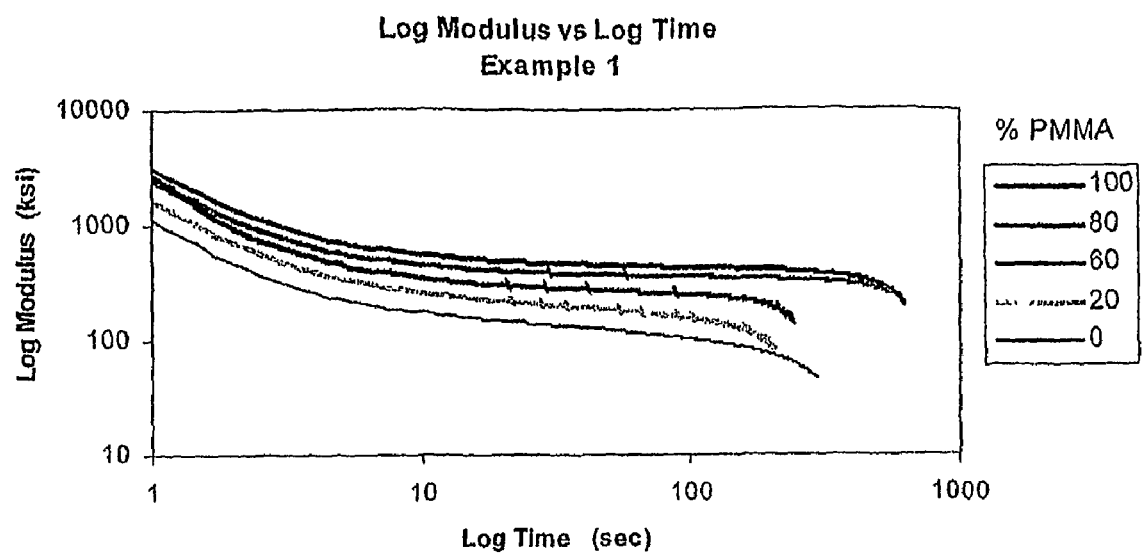
FIG. 16 a plot of log modulus versus log time for extruded composites.

The modulus of the extruded composites increases with PMMA content (FIG. 15). FIG. 16 is a plot of log modulus as a function of log time, which shows that the modulus of the blends and the resistance to deformation with time is increased with increasing PMMA content.

Figure 17:
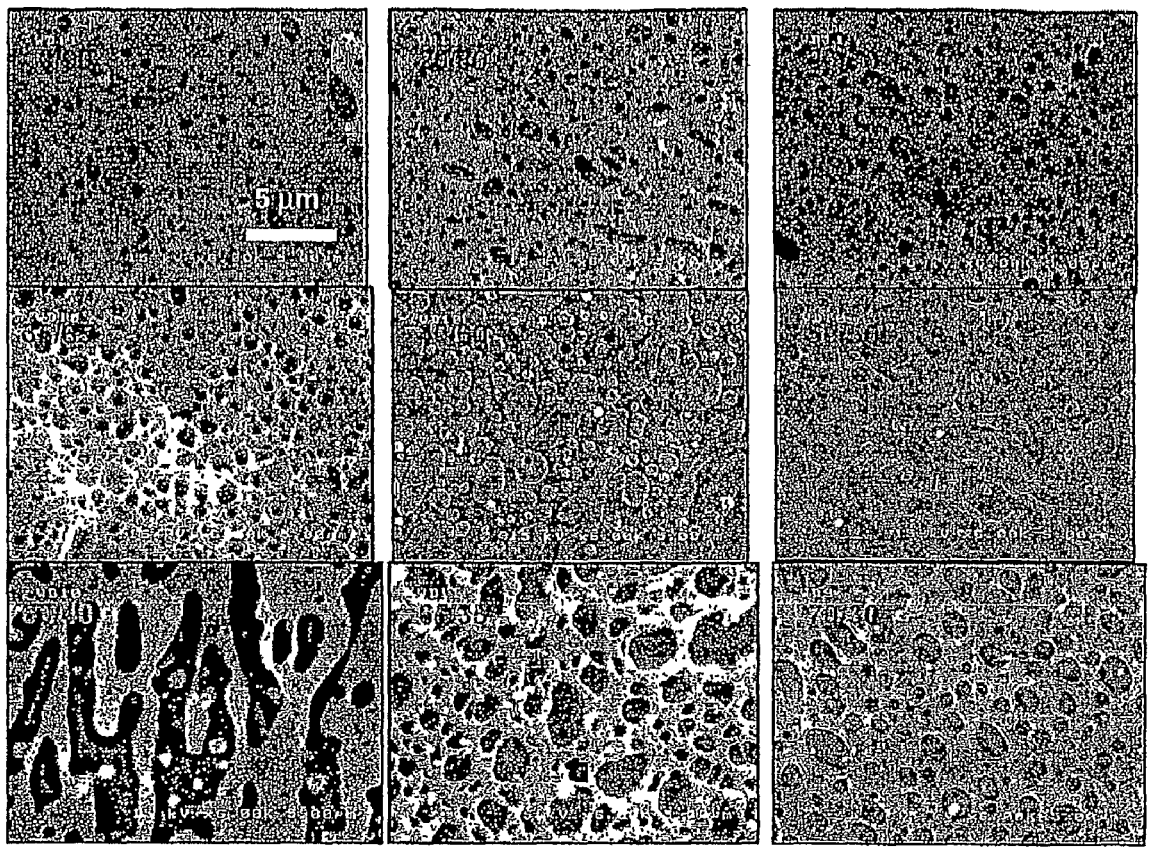
FIG. 17 is a series of SEM images of the surface structure of extruded composites.
Figure 18:
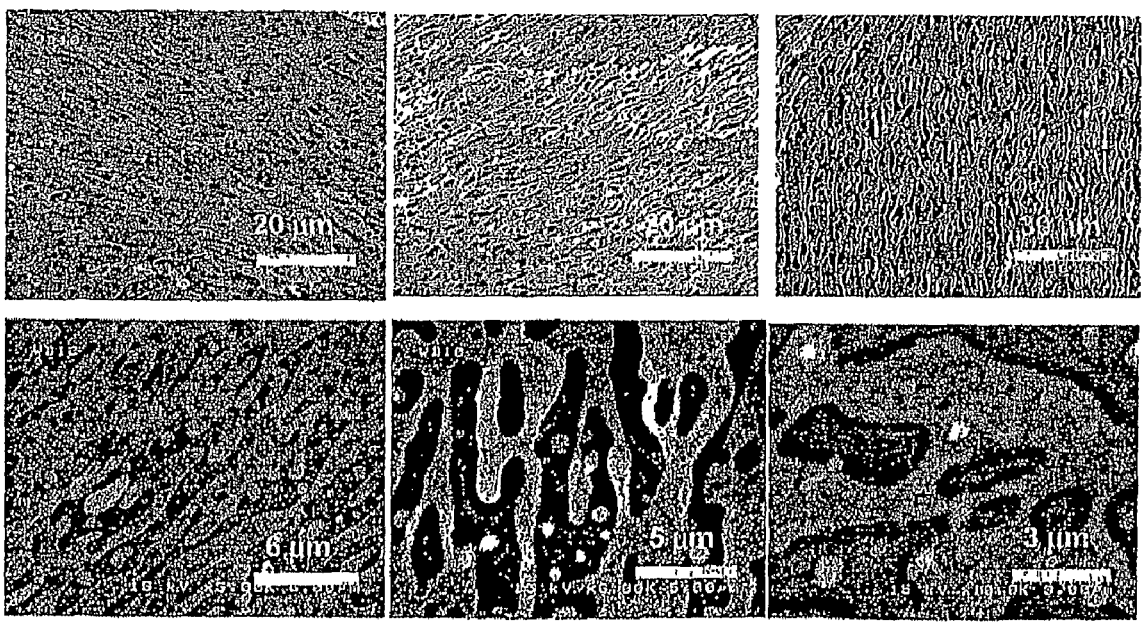
FIG. 18 is a series of SEM images of the surface structure of a 60/40 PMMA/HDPE extruded composite.

SEM images were obtained to examine the surface structure of the extruded composites (FIG. 17). The composite of 60/40 PMMA/HDPE exhibits co-continuous morphology (FIG. 18). Co-continuous morphologies have been known to exhibit exceptionally high stress transfer between the phases.

Example 2

Injection Molding

HDPE (CP Chem Marlex HHM-5502BN) and PMMA (Atofina Plexiglass V045100) were mechanically blended and injection molded using a Negri Bossi V55-200 Injection Molding Machine. Composites were molded at 392° F. Composition ratios of HDPE/PMMA: 100/0, 90/10, 80/20, 70/30, 65/35 60/40, 50/50, and 40/60.

Figure 19:
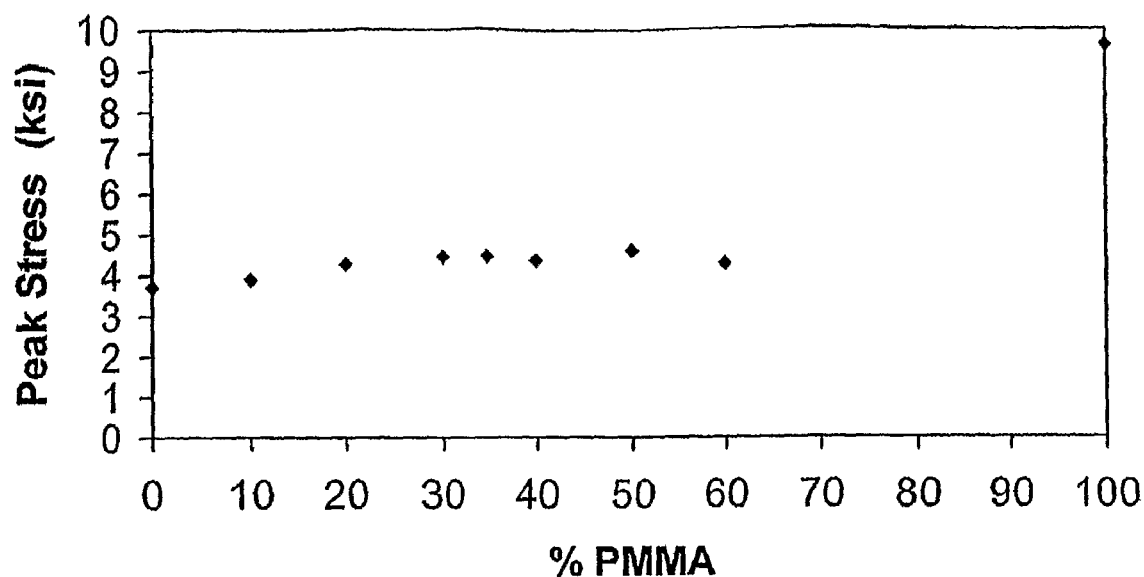
FIG. 19 is a plot of peak stress of composites formed via injection molding as a function of percent PMMA.
Figure 20:
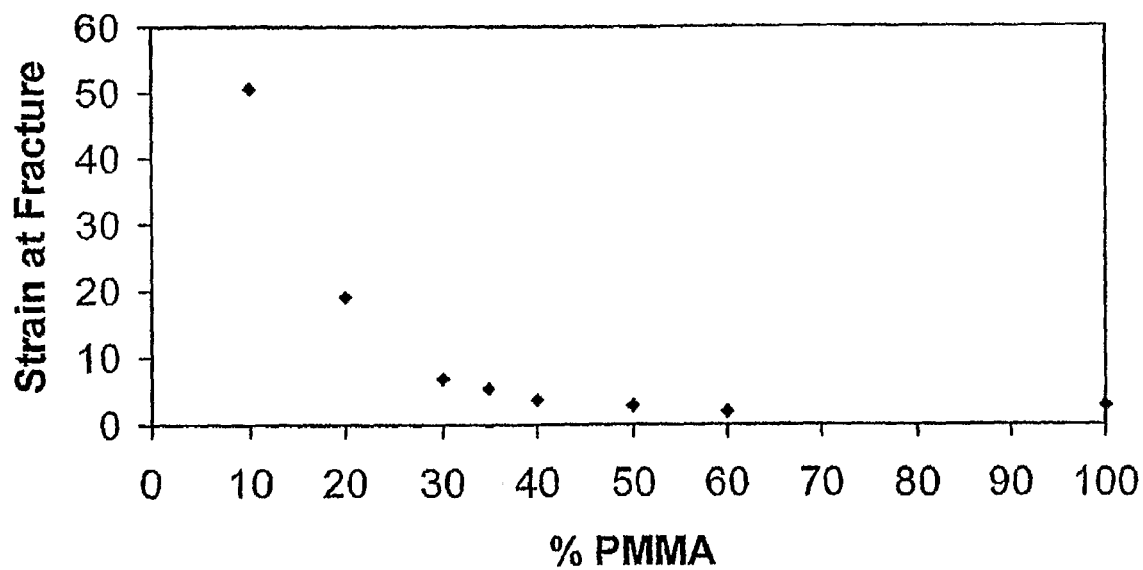
FIG. 20 is a plot of strain at fracture of composites formed via injection molding as a function of percent PMMA.

The tensile strength of the blends remains fairly constant in all blends from pure polyolefin up to and including the co-continuous region. (FIG. 19). The tensile strain drops as PMMA is blended at higher percentages to polyolefin in a non-linear manner, but remains much higher than pure PMMA itself. (FIG. 20).

Figure 21:
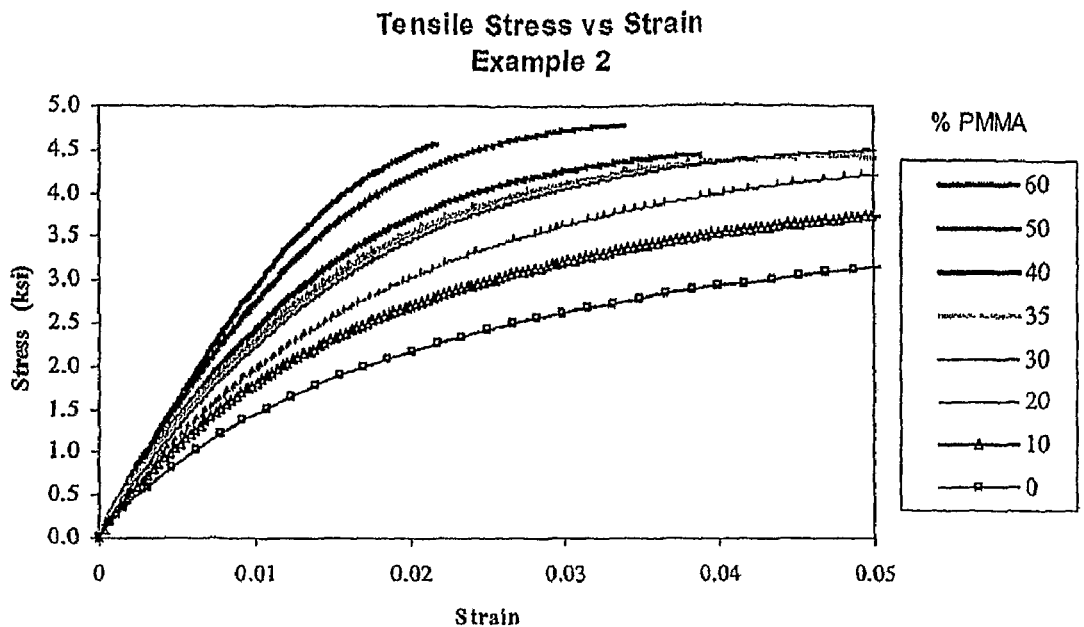
FIG. 21 is a plot of stress versus strain for composites formed via injection molding.

The modulus of the blends increases as PMMA is increased, but with lower strain to failure and resulting toughness. (FIG. 21). Many of the blends indicate higher toughness than PMMA or polyolefin alone. Results from FIG. 21 are summarized in Table II:

TABLE II

| % PMMA | Width (inches) | Thickness (inches) | Modulus (ksi) | Peak Stress (ksi) | % Strain at Fracture |
|---|---|---|---|---|---|
| 0 | 0.494 | 0.138 | 180.682 | 3.7 | 73.447 |
| 10 | 0.495 | 0.138 | 227.439 | 3.9 | 50.713 |
| 20 | 0.495 | 0.137 | 248.911 | 4.3 | 19.046 |
| 30 | 0.496 | 0.138 | 267.694 | 4.5 | 6.716 |
| 35 | 0.496 | 0.137 | 284.208 | 4.5 | 5.326 |

TABLE II-continued

| % PMMA | Width (inches) | Thickness (inches) | Modulus (ksi) | Peak Stress (ksi) | % Strain at Fracture |
|---|---|---|---|---|---|
| 40 | 0.496 | 0.137 | 294.963 | 4.4 | 3.639 |
| 50 | 0.497 | 0.132 | 328.982 | 4.6 | 2.873 |
| 60 | 0.496 | 0.135 | 346.735 | 4.3 | 2.013 |

Figure 22:
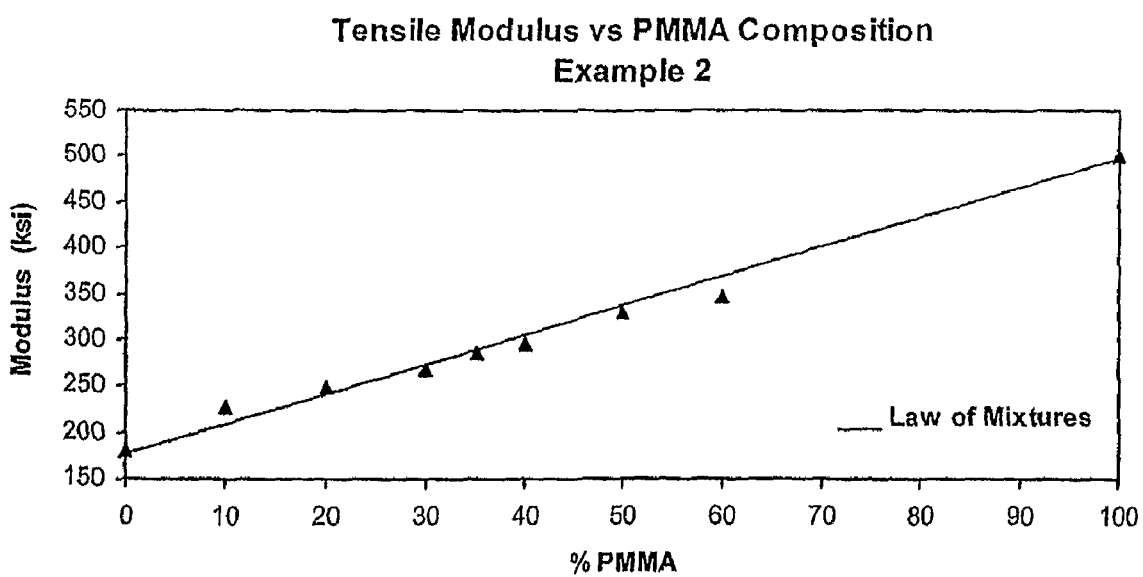
FIG. 22 is a plot of modulus as a function of percent PMMA for composites formed via injection molding.
Figure 23:
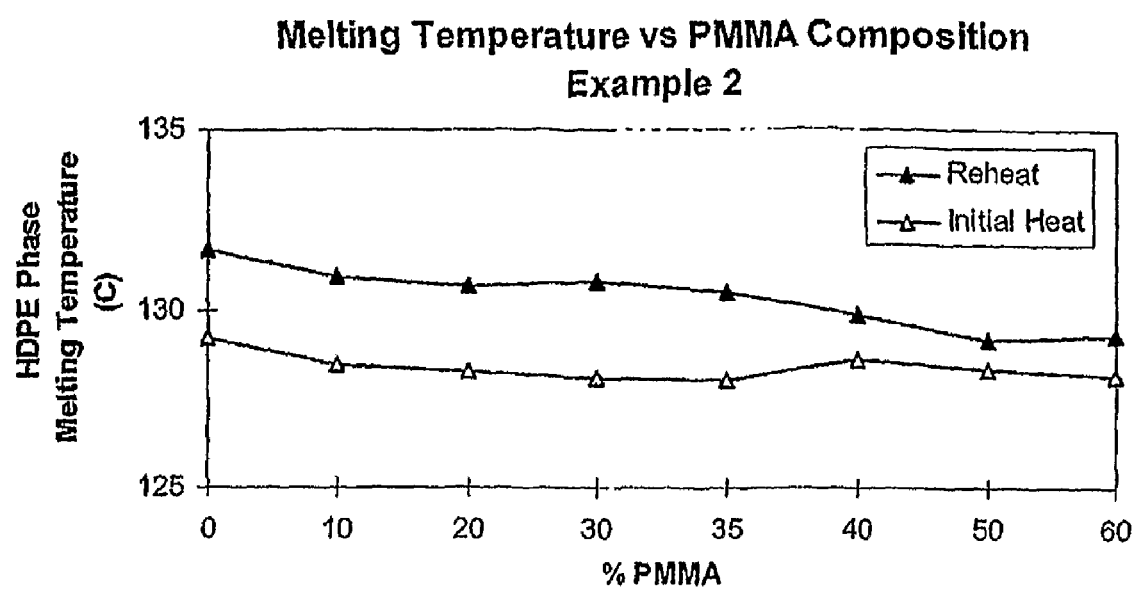
FIG. 23 is a plot of HDPE phase melting temperature as a function of percent PMMA for composites formed via injection molding.

The law of mixtures for modulus is generally followed in the blends, indicating that remarkably good stress transfer between the phases is achieved in this blend system. (FIG. 22). DSC reheat results are provided in FIG. 23.

The foregoing examples and description of the preferred embodiments should be taken as illustrating, rather than as limiting the present invention as defined by the claims. As will be readily appreciated, numerous variations and combinations of the features set forth above can be utilized without departing from the present invention as set forth in the claims. Such variations are not regarded as a departure from the spirit and script of the invention, and all such variations are intended to be included within the scope of the following claims.

What is claimed is:

1. A modular thermoplastic structural member comprising a web section disposed along a horizontal axis and one or more flange sections disposed along a horizontal axis parallel thereto and integrally molded to engage the top or bottom surface of said web section, wherein:
   the width of said flange sections measured perpendicular to said horizontal axis of said flange section is two to ten times the width of said web section measured perpendicular to said horizontal axis of said web section;
   the vertical dimension (thickness) of said flange sections are about one-tenth to about one-half the size of the vertical dimension of said web section without any flange sections;
   and said structural member is formed from a co-continuous immiscible polymer blend consisting essentially of
   a high density polyolefin and
   poly(methyl methacrylate), or poly(methyl methacrylate) and a thermoplastic polymer-coated fiber material, or poly(methyl methacrylate) and a thermoplastic polymer having fiber material embedded therein.

2. The modular thermoplastic structural member of claim 1, wherein said high-density polyolefin is high-density polyethylene (HDPE).

3. The modular thermoplastic structural member of claim 1, wherein said thermoplastic-coated fiber material is a thermoplastic-coated carbon or glass fiber.

4. The modular thermoplastic structural member composite of claim 1, characterized by being an I-Beam.

5. The modular thermoplastic structural member composite of claim 1, characterized by being a C-Beam.

6. The modular thermoplastic structural member composite of claim 1, characterized by being a T-Beam.

7. The thermoplastic c structural member of claim 1, wherein said polymer blend consists essentially of from about 20 to about 65 wt % of a poly(methyl methacrylate) component containing at least about 90 wt % poly(methyl methacrylate) and from about 40 to about 80 wt % of a high-density polyolefin component containing at least about 75 wt % high-density polyethylene (HDPE).

8. The thermoplastic structural member of claim 1, wherein said polymer blend consists essentially of comprises from about 20 to about 90 wt % of a polymer component and from about 10 to about 80 wt % of thermoplastic-coated fibers, wherein said polymer component consists essentially of from about 20 to about 65 wt % of a poly(methyl methacrylate) component containing at least about 90 wt % poly (methyl methacrylate) and from about 40 to about 80 wt % of a high-density polyolefin.

9. The thermoplastic structural member of claim 7, characterized by exhibiting a compression modulus of at least 227,000 psi. and a compression strength of at least 3900 psi.

10. The modular thermoplastic structural member of claim 1 wherein said structural members may be perpendicularly nested within each other.

11. The modular thermoplastic structural member of claim 1 wherein said flange sections form a 90° angle with said web section, such that additional structural members can be nested in the recess formed by said flange sections and said web section and be supported by at least one of said flange sections.

* * * * *